(12) United States Patent
Shammas

(10) Patent No.: US 7,862,122 B1
(45) Date of Patent: Jan. 4, 2011

(54) LIFT ASSIST FOR THE PHYSICALLY CHALLENGED

(76) Inventor: Linda Susan Shammas, 122 S. Rosemont Ave., Dallas, TX (US) 75208

( * ) Notice: Subject to any disclaimer, the term of this patent is extended or adjusted under 35 U.S.C. 154(b) by 113 days.

(21) Appl. No.: 12/316,655

(22) Filed: Dec. 15, 2008

(51) Int. Cl.
  *B60N 3/02* (2006.01)
(52) U.S. Cl. .............. 297/411.23; 297/411.2; 297/411.24; 297/411.27; 297/411.4; 297/DIG. 10
(58) Field of Classification Search .............. 297/411.2, 297/411.23, 411.24, 411.27, 411.4, DIG. 10
See application file for complete search history.

(56) References Cited

U.S. PATENT DOCUMENTS

| | | | | |
|---|---|---|---|---|
| 1,378,704 A | * | 5/1921 | McPartland | 297/411.23 |
| 1,890,102 A | * | 12/1932 | Urquhart | 297/411.23 |
| 3,639,929 A | * | 2/1972 | Ichise | 5/648 |
| 4,022,502 A | * | 5/1977 | Smith et al. | 297/411.23 |
| 4,159,148 A | * | 6/1979 | Schulz | 297/411.32 |
| 4,843,661 A | * | 7/1989 | Skibinski | 5/81.1 HS |
| 4,922,560 A | * | 5/1990 | Skibinski | 5/81.1 HS |
| 5,226,439 A | * | 7/1993 | O'Keeffe et al. | 135/66 |
| 5,397,169 A | * | 3/1995 | Willans | 297/411.23 |
| 5,465,744 A | * | 11/1995 | Browning | 135/67 |
| 5,471,689 A | * | 12/1995 | Shaw et al. | 5/662 |
| 5,509,432 A | * | 4/1996 | Peterson | 135/65 |
| 5,983,421 A | * | 11/1999 | Walser | 5/81.1 R |
| 6,050,644 A | * | 4/2000 | Neal | 297/411.24 |
| 6,134,731 A | * | 10/2000 | Thom et al. | 5/662 |
| 6,244,285 B1 | * | 6/2001 | Gamache | 135/67 |
| 6,813,789 B2 | * | 11/2004 | Leoutsakos | 5/662 |
| 6,860,281 B1 | * | 3/2005 | Clift | 135/67 |
| 7,237,844 B2 | * | 7/2007 | Stewart et al. | 297/411.36 |
| 7,416,257 B1 | * | 8/2008 | Lakhman | 297/487 |
| 7,472,445 B2 | * | 1/2009 | Miller | 5/662 |

* cited by examiner

*Primary Examiner*—Laurie K Cranmer
(74) *Attorney, Agent, or Firm*—Jeffrey Roddy

(57) ABSTRACT

An un-automated lift assist for the physically challenged whereby a user may push against a pair of armrests causing a portion of the armrest to initially compress, and later rebound when the individual is transitioning from a seated to an upright position. The lift assist has two upright side members with armrests and a base member with a support panel that are placed between a removable cushion of a article of furniture and the support frame of the article of furniture, so that the in-situ cushion is between a seated individual and the base member.

9 Claims, 6 Drawing Sheets

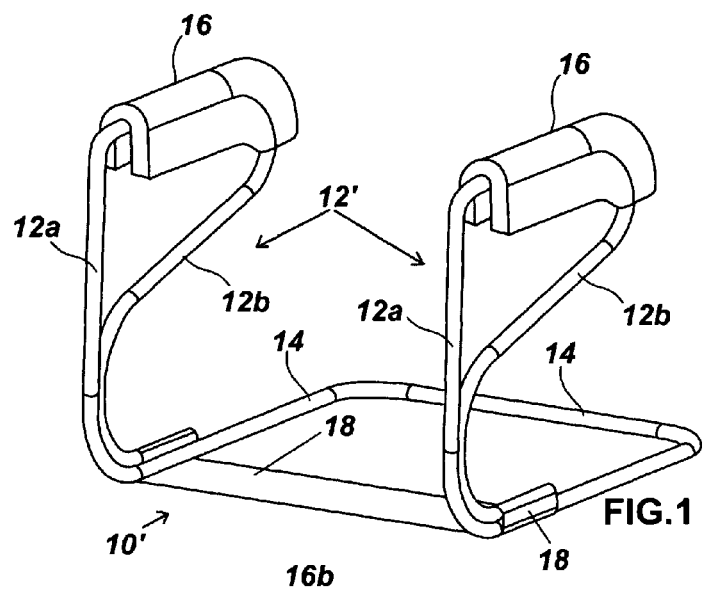
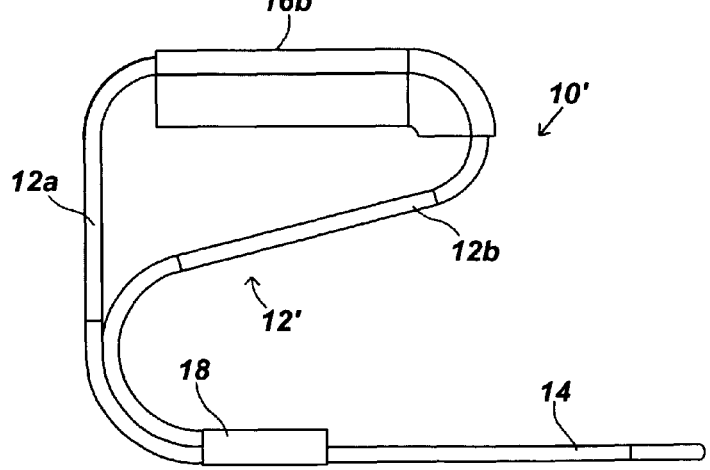

US 7,862,122 B1

LIFT ASSIST FOR THE PHYSICALLY CHALLENGED

CROSS REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

Simple un-automated riser aids to enable a physically challenged or senior citizen to rise from a seated position to a standing position have been described in the past. One such device has a bracket attached to the lower portion and affixed to the frame of the furniture that uses the mass of the furniture as a counterweight in order to prevent the device from tilting forward. While such a device works well for its intended use, and offers a low cost alternative to so-called automated riser seats, what is needed is a simple un-automated lift assist for the physically challenged that may be applied to an article or furniture without the need of altering the furniture, and provides a rebounding effect when a individual transitions from a sitting to a standing position.

SUMMARY OF THE INVENTION

The present invention relates generally to a mobility aid for the challenged, and specifically to a simple un-automated lift assist providing a means for such an individual to transition from a seated position to a standing position, and more specifically, to such a device having two armrests that compress slightly when an individual leans on them, and rebound when the individual's weight is shifted sufficiently forward as occurs naturally when transitioning from a sitting to a standing position.

One object of the present invention is to provide a device assistive of the physically challenged in transitioning from a seated position to a standing position.

Another object of the present invention is to provide a means of rising from a sitting position to a standing position while maintaining stability and preventing a physically challenged user from falling forward.

Another object of the present invention is to offer a low cost alternative to expensive automated riser chairs.

Another object of the present invention is a to provide a fully manual device having a portion that rebounds as an assist in transitioning a seated person to a standing position.

Another object of the present invention is to offer an assistive device that may be fitted to most articles of furniture having removable cushions.

Another object of the present invention is to offer an assistive device that may be installed in an article of furniture without any alteration of the furniture or the device.

Another object of the present invention, in view of the physical demands made upon such a device, is to provide a lift assist with the requisite strength to support larger individuals, while maintaining a light weight construction.

Another object of the present invention is to maintain the comfort provided by a standard seat cushion, with the benefits of a lift assist.

For a further understanding of the nature and objectives of the present invention, reference should be made to the following detailed description, taken in conjunction with the accompanying drawings, in which like elements are given the same or analogous reference numbers in which:

BRIEF DESCRIPTION OF THE DRAWINGS

FIG. 1 is a rearward perspective view of a preferred embodiment in accordance with the present invention;

FIG. 2 is a side elevation of the preferred embodiment of FIG. 1, in accordance with the present invention;

DETAILED DESCRIPTION OF THE EMBODIMENTS

Figure 3:
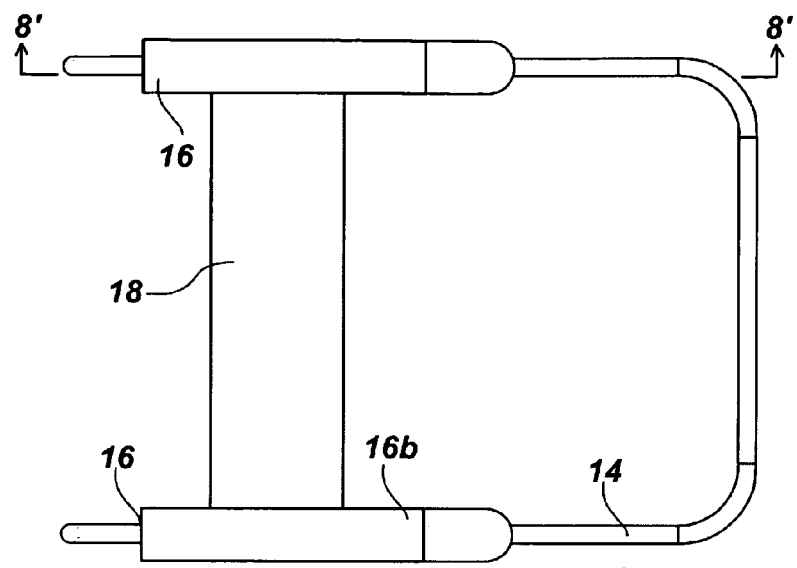
FIG. 3 is a top plan view of the embodiment of FIGS. 1-2, in accordance with the present invention.

Referring generally to FIGS. 1-11, a fully manual assistive device 10' in support of a physically challenged individual as an aid in transitioning from a seated to a standing position, and which is fitted to various furniture items including, but not limited to chairs, sofas and beds is described. While optimally, the assistive device is used with furniture items with removable cushions; it may also be used by sliding between a mattress and box springs. The assistive device is of lightweight tubular construction with a base member 14 that is positioned in use beneath a seat cushion; the base member being contiguously joined to a pair of upright members 12' that each include (1) a vertical section 12a, bent at a generally 90 degree angle to the base member, and having a horizontal section capped with an armrest 16, 16b, 16c, and (2) a generally 'S' shaped reinforcement section 12b. Both the base and upright members are made of tubular sections that are joined together contiguously by mating sections having distal portions of unreduced diameter over reduced diameter distal portions of adjacent sections, however it is possible that the tubular sections may be butt welded end to end, or a the entire unit may be made of a single continuous length of bent tubular channel. Each vertical section 12a is bent at the bottom to a radii preferably between 5-20 centimeters where it joins the base member, and has a horizontal section that transitions into the generally 'S' shaped reinforcement section 12b that is in communication with both the base member 14 and vertical section 12a. A generally rectangular spacer panel 18 of rigid material is fixed between the upright members 12', to maintain structural stability and fix the distance between the vertical sections. Preferably, the spacer panel is made of sheet steel or aluminum, although other materials such a rigid plastic sheet may be used. The spacer panel may be affixed to the tubular sections by riveting to the base member, or by bolts and nuts, or by gluing directly to the base member 14. Owing to generally high ductility, the tubular sections are preferably steel tubing having an outside diameter between 1.24 centimeters and 2.6 centimeters with a wall thickness of between 0.8 millimeters and 2.4 millimeters, however, as will be understood by one skilled in the art, aluminum alloy tubing and fiber reinforced resin of varying diameter and wall thicknesses may be used.

Figure 10:
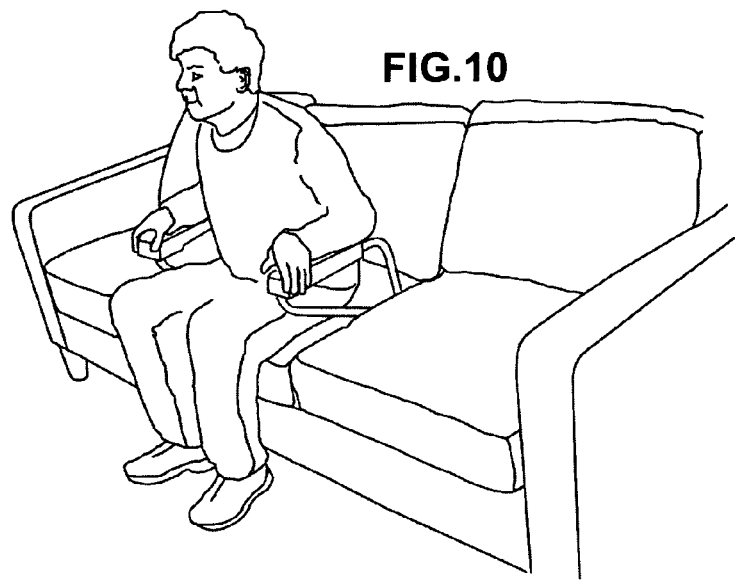
FIG. 10 is a perspective view of a preferred embodiment in accordance with the present invention showing an individual seated within the bounds of the present invention.
Figure 11:
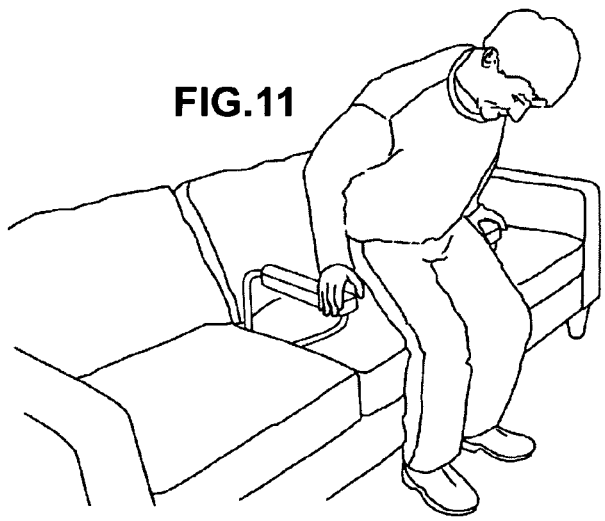
FIG. 11 is a perspective view of a preferred embodiment in accordance with the present invention showing an individual rising from within the bounds of the present invention.

Referring generally to FIG. 10 and FIG. 11, the present invention is used by placing base member 14 under a removable seat cushion of a sofa or a chair. An individual sits upon the seat cushion between the upright members. By shifting his or her weight forward while grasping the armrests 16, 16b, 16c, the individual may transition from a seated position to a substantially upright position. In order to complete the transition from a seated to a standing position, the individual grips the armrests at that position roughly corresponding to his or her center of gravity; generally to each side of the pelvic arch and aligning with the front one-thirds of each armrest, and pushes against the armrests to raise himself to an upright position. In the early stage of the transition, the armrests compress slightly, tilting down at the rear as the individual applies weight to the frame. When the individual's center of gravity is shifted forward relieving the armrests of the load, this causes the armrests to act like springs rebounding and releasing kinetic energy to help boost an individual to a standing position. Most preferably, the present invention is installed as is shown in FIGS. 10-11 corresponding to the preferred embodiment of FIGS. 1-4, with the vertical sections 12a against the rear back cushion, although conceivably the lift assist may be reversed (not shown), using the armrests configured as in the embodiments of FIGS. 5-8, with the vertical sections facing out in situations where the possible tilting of the lift assist is not an issue, for example, where a user has sufficient leg strength to steady themselves, but weaker upper extremities.

Figure 4:
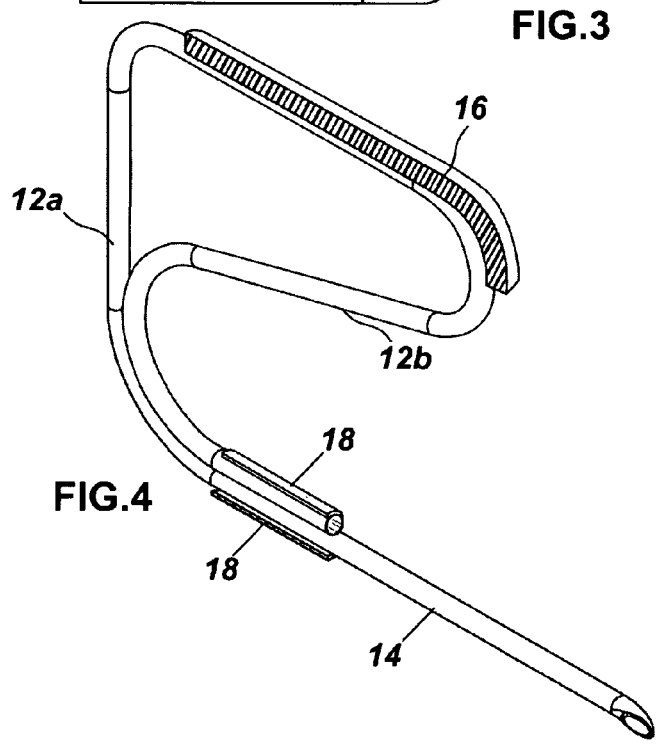
FIG. 4 is a sectional view taken along lines 8'-8' of FIG. 3.
Figure 5:
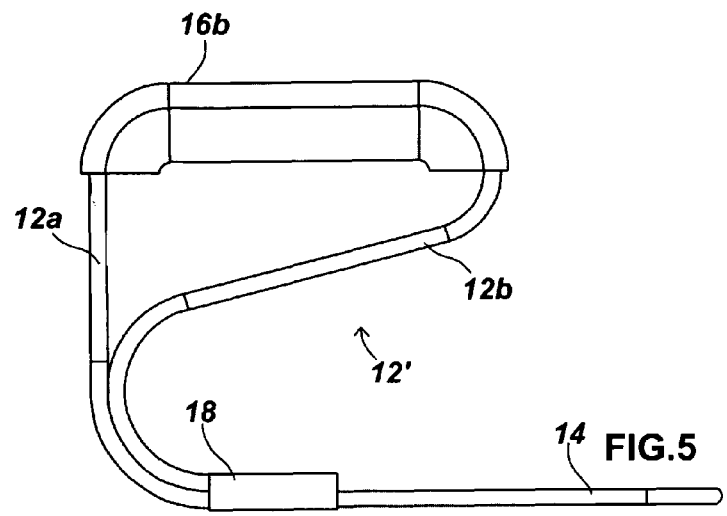
FIG. 5 is a side elevation of an alternate embodiment in accordance with the present invention.
Figure 6:
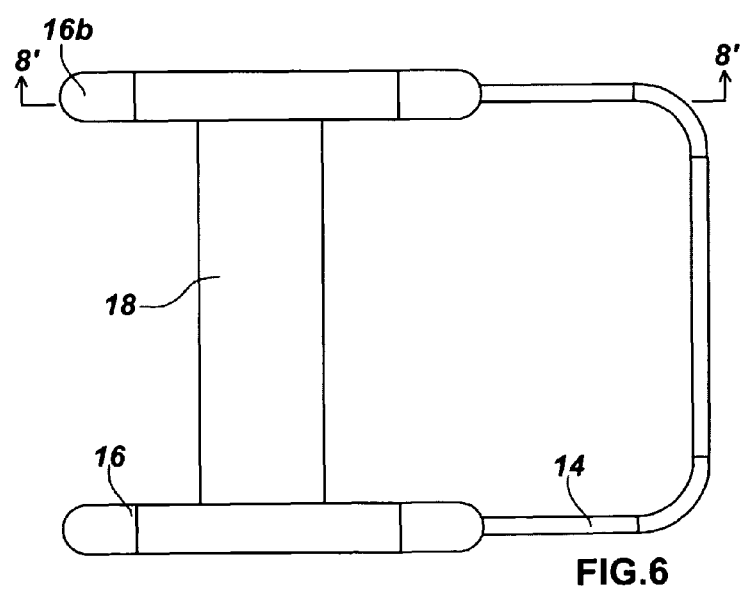
FIG. 6 is a top plan view of the alternate embodiment of FIG. 5, in accordance with the present invention.
Figure 7:
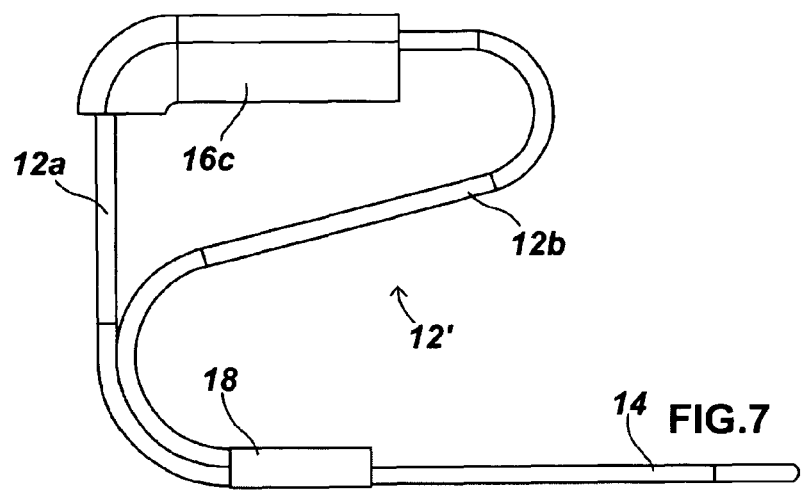
FIG. 7 is a side elevation of an alternate embodiment in accordance with the present invention.
Figure 8:
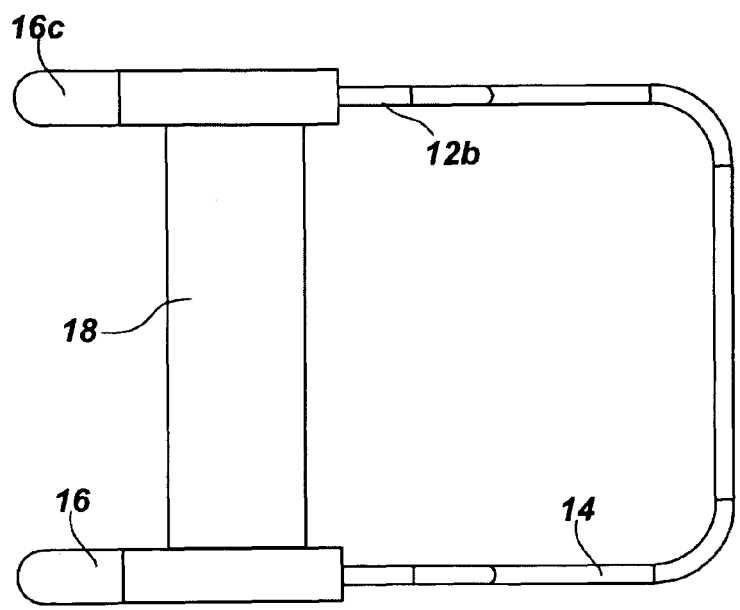
FIG. 8 is a top plan view of the alternate embodiment of FIG. 7, in accordance with the present invention.
Figure 9:
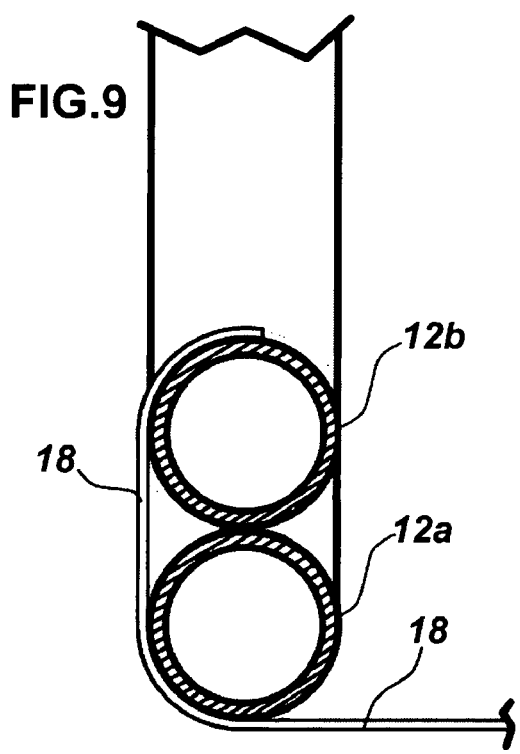
FIG. 9 is a partial sectional view taken along lines 7'-7' of FIG. 2.

Referring to FIG. 9, a partial sectional view taken along lines 7'-7' of FIG. 3, shows the generally spacer panel 18 curled up and over both vertical section 12a and the 'S' shaped reinforcement section 12b. The spacer panel may be affixed at its distal ends to the sections 12a, 12b by rivets, bolts or adhesive (not shown), thereby maintaining a set distance between vertical sections 12'. FIG. 4, a sectional view taken along lines 8'-8' of FIG. 2 shows the framework of tubular sections joined contiguously with the uppermost horizontal section running lengthwise through the armrest. FIGS. 10-11 show a typical use of the present invention, where respectively 1) a individual is shown within the bounds of the lift assist that has been installed in a typical three cushion sofa with removable cushions, and 2) the individual rising from the sofa by pushing off against the armrests, 16 causing the front of each armrest to bow downward slightly to rebound slightly during the transition from a seated to an upright position. Conceivably, all of the aforementioned embodiments may include a cup holder either molded into, or attached to the armrests (not shown), and additionally, a swing away table may be affixed to either the frame or the armrest (not shown). It should also be understood that the lengths of sections 12a and 12b and 14 may be sized to accommodate most articles of furniture with any thickness of cushion.

While the invention has been described by the embodiments and examples given, these are not intended to limit the scope of the invention to the particular form set forth, but on the contrary, it is intended to cover such alternatives, modifications, and equivalents as may be included within the spirit and scope of the invention as defined by the appended claims.

What is claimed is:

1. A lift assist for helping a human being to rise from a seated position to a standing position comprising:
    a pair of upright members each capped with an armrest and each including an "S" shaped reinforcement section; and,
    a base member contiguous with and disposed between the upright members; and,
    a spacer panel disposed between the upright members and, securing the pair of upright members and the base member together, with the pair of upright members being sufficiently distanced to permit an human being to sit therebetween, and the base member and the spacer panel being positioned for use between a removable cushion and a support frame of an article of furniture, with the removable cushion disposed between the base member and the human being.

2. The lift assist of claim 1 in which the base member and the upright members further comprise a plurality of bent and straight channel segments.

3. The lift assist of claim 1 in which the base member and the upright members are tubular.

4. The lift assist of claim 1 in which the base member and the upright members are of a material taken from at least one of the following; steel, aluminum alloy, steel alloy, fiberglass, carbon fiber, fiber reinforced plastic.

5. The lift assist of claim 1 in which the spacer panel maintains a set spacing between the upright members and inhibits a removable cushion from falling through the base member.

6. A method of rising from a seated to a standing position employing the lift assist of claim 1, comprising the steps:
    a. installing an article of furniture with the lift assist in which,
        i) the base member is positioned between a removable cushion and a furniture frame; and,
    b. sitting within the bounds of the lift assist; and,
    c. gripping the armrests; and,
    d. applying a load to generally the front one-third of each armrest using upper body strength to lift oneself away from a sitting position, the load sufficient to compress each armrest such that each armrest inclines slightly toward the rear of the lift assist; and,
    e. transitioning to shift the body's center of gravity forward to relieve the load placed on the armrests, to allow the armrest to release stored energy by rebounding; and,
    f. using the rebounding provided to complete the transition to a substantially upright position.

7. The lift assist of claim one in which the armrests deform downwardly when the person rises from the seated position transferring the kinetic energy to the S-shaped section.

8. The lift assist of claim one in which the armrests spring upwardly releasing the stored kinetic energy when the person transitions from the seated position to a standing position.

9. A lift assist for helping a person to rise from a seated position to a standing position comprising:

a pair of upright members each including a vertical section and an S-shaped section, the vertical sections capped with an armrest; and, a base member disposed between and transitioning to the vertical sections, and the vertical sections transitioning to the S-shaped sections which partially abut the vertical sections and the base member; and, a spacer panel disposed between the upright members and securing the pair of upright members and the base together, the upright panels being sufficiently distanced to permit a person to sit therebetween, and the base member and the spacer panel positioned for use between a removable cushion and a support frame of an article of furniture, the removable cushion disposed between the base member and the person.

\* \* \* \* \*